(12) United States Patent
Turtinen et al.

(10) Patent No.: US 11,997,604 B2
(45) Date of Patent: May 28, 2024

(54) WAKE-UP SIGNAL WITH RANDOM ACCESS RESPONSE

(71) Applicant: Nokia Technologies Oy, Espoo (FI)

(72) Inventors: Samuli Turtinen, Ii (FI); Jussi-Pekka Koskinen, Oulu (FI); Sami-Jukka Hakola, Kempele (FI); Timo Koskela, Oulu (FI); Jorma Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 232 days.

(21) Appl. No.: 17/284,191

(22) PCT Filed: Sep. 29, 2020

(86) PCT No.: PCT/FI2020/050642
§ 371 (c)(1),
(2) Date: Apr. 9, 2021

(87) PCT Pub. No.: WO2021/094648
PCT Pub. Date: May 20, 2021

(65) Prior Publication Data
US 2022/0312325 A1    Sep. 29, 2022

Related U.S. Application Data

(60) Provisional application No. 62/934,642, filed on Nov. 13, 2019.

(51) Int. Cl.
*H04W 52/02* (2009.01)
*H04W 74/04* (2009.01)
(Continued)

(52) U.S. Cl.
CPC ....... *H04W 52/0232* (2013.01); *H04W 74/04* (2013.01); *H04W 74/0841* (2013.01)

(58) Field of Classification Search
CPC ............ H04W 74/006; H04W 74/004; H04W 74/0083; H04W 74/0841; H04W 76/11;
(Continued)

(56) References Cited

U.S. PATENT DOCUMENTS

2011/0128948 A1* 6/2011 Jeon .................... H04W 74/002
                                                                    370/338
2017/0019930 A1   1/2017 Lee et al. ...................... 74/833
(Continued)

FOREIGN PATENT DOCUMENTS

JP    2020501431 A    1/2020
JP    2021504987 A    2/2021
WO    2018/204799 A1  11/2018

OTHER PUBLICATIONS

Vivo; "PDCCH-based power saving signal/channel"; Agenda Item: 7.2.9.1; R1-1906170 3GPP TSG RAN WG1 #97 Reno, USA, May 13-17, 2019 (Year: 2019).*

(Continued)

*Primary Examiner* — Gary Mui
(74) *Attorney, Agent, or Firm* — Harrington & Smith

(57) ABSTRACT

In accordance with an example embodiment of the present invention, a method comprising determining, by a network device of a communication network, a time period for monitoring a random access response; identifying that a wake-up signal occasion for a wakeup signal is overlapping a predetermined time period for the random access response, wherein the predetermined time period comprises the determined time period; and based on the identifying, controlling monitoring of the wake-up signal occasion for a wake-up signal, is disclosed.

17 Claims, 4 Drawing Sheets

---

310: determining, by a network device of a communication network, a time period for monitoring a random access response 320: identifying that a wake-up signal occasion for a wake-up signal is overlapping a predetermined time period for the random access response;

330: based on the identifying, controlling monitoring of the wake-up signal occasion for a wake-up signal

(51) Int. Cl.
*H04W 74/08* (2009.01)
*H04W 74/0833* (2024.01)

(58) Field of Classification Search
CPC ............. H04W 76/18; H04W 52/0229; H04W 52/0232
See application file for complete search history.

(56) References Cited

U.S. PATENT DOCUMENTS

| | | | |
|---|---|---|---|
| 2019/0239189 A1 | 8/2019 | Hwang et al. | |
| 2020/0145921 A1* | 5/2020 | Zhang | H04W 76/27 |
| 2020/0351784 A1* | 11/2020 | Tsai | H04W 76/28 |
| 2020/0359325 A1* | 11/2020 | Turtinen | H04W 52/0235 |
| 2021/0099954 A1* | 4/2021 | Agiwal | H04W 72/23 |
| 2021/0105722 A1* | 4/2021 | Tsai | H04W 52/0235 |
| 2021/0306951 A1* | 9/2021 | Hwang | H04W 52/0235 |
| 2022/0039013 A1* | 2/2022 | Shi | H04L 1/1864 |
| 2022/0217677 A1* | 7/2022 | Takeda | H04W 72/02 |
| 2022/0232663 A1* | 7/2022 | Koskinen | H04W 52/0229 |
| 2022/0264464 A1* | 8/2022 | Seo | H04W 72/23 |
| 2022/0295563 A1* | 9/2022 | Turtinen | H04W 74/0833 |
| 2022/0303902 A1* | 9/2022 | Tao | H04W 72/0446 |

OTHER PUBLICATIONS

Asia Pacific Telecom co. Ltd; "UE behavior on WUS occasion in DRX Active Time"; Agenda item: 11.11.2 3GPP TSG-RAN WG2 Meeting #107 Prague, Czech Republic, Aug. 26-30, 2019; R2-1911618 (Year: 2019).*

"New WID: UE Power Saving in NR", 3GPP TSG RAN Meetings #84, RP-191607, Agenda : 9.4.6, CATT, Jun. 3-6, 2019, 5 pages.

"3rd Generation Partnership Project; Technical Specification Group Radio Access Network; NR; Medium Access Control (MAC) protocol specification(Release 15)", 3GPP TS 38.321, V15.7.0, Sep. 2019, pp. 1-78.

International Search Report and Written Opinion received for corresponding Patent Cooperation Treaty Application No. PCT/FI2020/050642, dated Jan. 11, 2021, 14 pages.

"WUS Consideration for efeMTC", 3GPP TSG RAN WG2 Meeting #99bis, R2-1710641, Agenda : 9.14.9, Intel Corporation, Oct. 9-13, 2017, 7 pages.

Office Action received for corresponding Indian Patent Application No. 202247028048, dated Sep. 9, 2022, 6 pages.

Extended European Search Report received for corresponding European Patent Application No. 20853587.2, dated May 20, 2022, 5 pages.

"Remaining aspects of PDCCH-based power saving signal", 3GPP TSG RAN WG1 #99, R1-1912049, Agenda : 7.2.9.1, vivo, Nov. 18-22, 2019, 11 pages.

"On PDCCH-based power saving techniques", Nokia, Nokia Shanghai Bell, 3GPPTSG RAN WG1 meeting #99, R1-19131111, Nov. 2019, 14 pages.

"Power Saving Signal Procedure and Configuration", CATT, 3GPP TSG RAN WG2 Meeting #107, R2-1908888, Aug. 2019, 5 pages.

* cited by examiner

WAKE-UP SIGNAL WITH RANDOM ACCESS RESPONSE

RELATED APPLICATION

This application was originally filed as PCT Application No. PCT/FI2020/050642 on Sep. 29, 2020, which claims priority from U.S. provisional patent application No. 62/934,642 filed on Nov. 13, 2019.

CROSS-REFERENCE TO RELATED APPLICATIONS

This application claims priority from U.S. provisional patent application No. 62/934,642 filed on Nov. 13, 2019. The contents of this earlier filed application are hereby incorporated by reference in their entirety.

TECHNICAL FIELD

The teachings in accordance with the exemplary embodiments of this invention relate generally to operations for monitoring a wake-up signal and, more specifically, relate to determining operations for monitoring a wake-up signal when the wake-up signal occasion overlaps with a random access response window. The wake-up signal occasion may also refer to wake-up signal monitoring occasion, i.e. candidate monitoring occasions on which the UE tries to detect the wake-up signal.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
ACK acknowledgement
BFR beam failure recovery
CA carrier aggregation
CBRA contention Based Random Access
CFRA contention Free Random Access
CRC cyclic redundancy check
C-RNTI cell-radio network temporary identifier
DCI downlink control information
DL downlink
DRX discontinuous reception
MAC medium access control
MCG master cell group
NW network
PCell primary cell
PDCCH physical downlink control channel
PRACH physical random access channel
PCell primary cell
PSCell primary secondary cell
PS-RNTI power saving radio network temporary identifier
RA random access
RA-RNTI random access radio network temporary identifier
RACH random access channel
RAR random access response
RLM radio link monitoring
RNTI radio network temporary identifier
RRC radio resource control
RRM radio resource management
SCell secondary cell
SCG secondary cell group
SPCell special cell, primary cell of a master or secondary cell group
TC-RNTI temporary cell-radio network temporary identifier
UL uplink
WUS wake-up signal In radio technology systems at the time of this application, there can be control of a behavior of a user equipment (UE) for communications including uplink (UL) and/or downlink (DL) communications. This behavior can relate to frequency, timing, and power for the communications.

It is noted that during a low power mode for example a UE may not be synchronized in an UL for example. Thus the UE may use a random access procedure to derive an UL frequency and a power estimate from the DL signals such as control signals. After the random access procedure, the network node can estimate the timing misalignment of the UE UL and enable correction.

Example embodiments of the invention work to improve at least operations associated with such random access procedures, particularly while a UE is using a wake-up signal (WUS) configuration.

SUMMARY

Some example embodiments are directed to a method. The method comprising determining, by a network device of a communication network, a time period for monitoring a random access response; identifying that a wake-up signal occasion for a wakeup signal is overlapping a predetermined time period for the random access response, wherein the predetermined time period comprises the determined time period; and based on the identifying, controlling monitoring of the wake-up signal occasion for a wake-up signal.

Other example embodiments may be directed to an apparatus. The apparatus may include at least one processor and at least one memory including computer program code. The at least one memory and computer program code may be configured to, with the at least one processor, caused the apparatus at least to determining a time period for monitoring a random access response; identifying that a wake-up signal occasion for a wakeup signal is overlapping a predetermined time period for the random access response, wherein the predetermined time period comprises the determined time period; and based on the identifying, controlling monitoring of the wake-up signal occasion for a wake-up signal.

Other example embodiments may be directed to an apparatus. The apparatus may include means for determining a time period for monitoring a random access response; means for identifying that a wake-up signal occasion for a wakeup signal is overlapping a predetermined time period for the random access response, wherein the predetermined time period comprises the determined time period; and based on the identifying, means for controlling monitoring of the wake-up signal occasion for a wake-up signal.

Other example embodiments may be directed a non-transitory computer readable medium which may be encoded with instructions that may, when executed in hardware, perform a method. The method may include determining a time period for monitoring a random access response; identifying that a wake-up signal occasion for a wakeup signal is overlapping a predetermined time period for the random access response, wherein the predetermined time period comprises the determined time period; and based on the identifying, controlling monitoring of the wake-up signal occasion for a wake-up signal.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

Figure 1A:
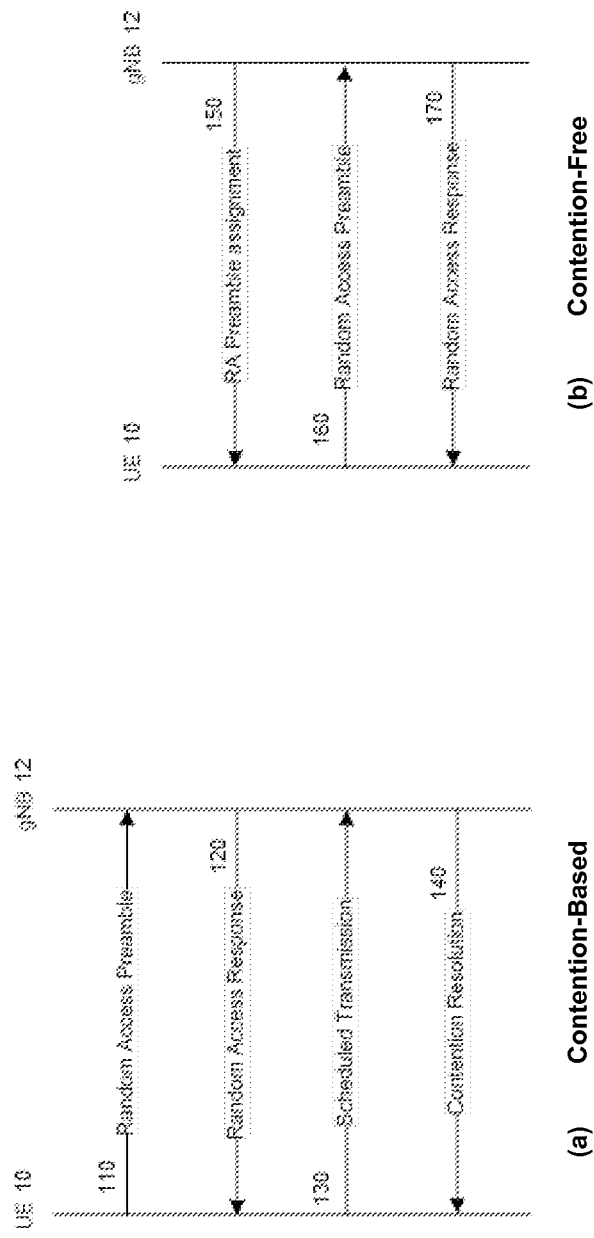
FIG. 1A shows a flow chart of a contention-based random access procedure and a contention-free random access procedure.

In example embodiments of this invention, there is provided operations for monitoring a wake-up signal when the wake-up signal occasion overlaps with a random access response window.

A Random Access procedure described may be initiated by a PDCCH order, by the MAC entity itself, or by RRC. There may be one Random Access procedure ongoing at any point in time in a MAC entity.

It is noted that a Random Access procedure can be initiated by a PDCCH order or by the MAC sublayer itself. The PDCCH order or RRC optionally indicate a Random Access Preamble and PRACH resource. Subsequent to the RACH procedure being initiated, there can be identified an available set of PRACH resources for the transmission of the Random Access Preamble and their corresponding RA-RNTIs, can be identified groups of Random Access Preambles and a set of available Random Access Preambles in each group, determining thresholds required for selecting one of the groups of Random Access Preambles, and parameters required to derive and/or monitor a RAR window for the Random Access Procedures.

Further, WUS (Wake-up Signalling) modelling remains under discussion with regards to power saving, and at the time of this application DRX has been supported for power saving for NR as well.

WUS is designed to allow the UE to skip PDCCH monitoring during DRX OnDurations when there is no data transmission to be done. This monitoring can be performed during a PDCCH occasion time duration (e.g., one or a consecutive number of symbols) during which a MAC entity associated with the UE is configured to monitor the PDCCH. If the NW intends to schedule the UE, it needs to send wake up signalling to the UE during the WUS occasion(s) to wake up the UE first, the UE will then monitor normal PDCCH for scheduling data at the coming DRX OnDuration. DRX OnDuration may refer to starting a timer (e.g., drx-onDurationTimer) during which the UE is in DRX Active Time and monitors PDCCH. WUS may refer to signaling by the NW to the UE based on which the UE starts the timer for the next DRX OnDuration. Such signaling by the NW may be conducted by means of L1 signaling (e.g., by Downlink Control Information—DCI), by means of MAC signaling (e.g., by MAC Control Element), or by means of RRC signaling. Additionally, the WUS may be L1 signaling DCI with CRC scrambled by PS-RNTI based on which the UE decodes the DCI with such WUS control information. The WUS may also be called as WUI (Wake Up Indication), PSI (Power Saving Indication), or DCP (DCI with CRC scrambled by PS-RNTI). Furthermore, the PS-RNTI may be defined as UE identification for indicating a UE to monitor PDCCH on the next occurrence of the connected mode DRX on-duration.

At the time of this application the following has been agreed to:

| Agreements: | |
| --- | --- |
| 1. | The PDCCH-WUS triggers a MAC entity to "wake up" to monitor PDCCH at reception of the PDCCH-based power saving signal/channel for the next occurrence of the drx-onDurationTimer. |
| 2. | The PDCCH-WUS is considered jointly with DRX i.e. it is only configured when DRX is configured. |
| 3. | The PDCCH-WUS is monitored at occasions located at a configured offset before the start of the drx-onDurationTimer. The offset is part of physical layer design. |
| 4. | On a PDCCH-WUS occasion that a UE is monitoring, if the UE is indicated to wake-up to monitor the PDCCH during the next occurrence of the drx-onDurationTimer, the UE starts the drx-onDurationTimer at its next occasion. Otherwise it does not. |
| 5. | From RAN2 point of view the UE does not monitor WUS during active time. |
| 6. | If UE is in DRX Active Time during a PDCCH-WUS occasion, it starts the drx-onDurationTimer at its next occasion as in legacy. |
| 7. | The WUS is configured on the PCell with CA and SpCell with DC (i.e. PCell on MCG and PSCell on SCG) |
| 8. | RLM and RRM measurements are not impacted by WUS design (i.e. the UE continues to measure the required reference signals as per RRM requirements) |

For the Random Access procedure, currently the monitoring of the RAR window by the UE (or MsgB window in case of 2-step RACH) is not considered as active time, i.e., UE will monitor only the determined RA-RNTI/MsgB-RNTI and its C-RNTI for random access response. However, if WUS occasion overlaps with the RAR/MsgB window run, the UE behaviour should be defined.

FIG. 1 shows a flow charts of (a) Contention-Based random access procedure and (b) Contention-Free random access procedure.

First, with regards to FIG. 1, a random access procedure can be triggered by events such as:
Initial access from RRC IDLE;
RRC Connection Re-establishment procedure;
DL or UL data arrival during RRC CONNECTED when UL synchronisation status is "non-synchronised";
UL data arrival during RRC CONNECTED when there are no PUCCH resources for SR available;
SR failure;
Request by RRC upon synchronous reconfiguration (e.g. handover);
Transition from RRC INACTIVE;

To establish time alignment for a secondary TAG;
Request for Other SI; and/or
Beam failure recovery.

As shown in the flow chart of FIG. 1 for (a) Contention-Based random access (CBRA) there is at step 110 a random access preamble communicated from the UE 10 to the gNB 12. Here the communication may be referred to as Msg1 (Message 1), where the user equipment selects and transmits to the base station a preamble sequence from a preamble sequence resource pool. Following this, there is shown at step 120 of FIG. 1 for (a) Contention-Based random access that the gNB responds with a random access response. This response may be referred to as Msg2 (Message 2) with RAR, i.e., a Random Access Response (RA Response) to the user equipment. The RAR can contain a random access preamble sequence identifier, a timing advance instruction determined according to an estimation of a time delay between the user equipment and the base station, a Temporary Cell-Radio Network Temporary Identifier (TC-RNTI), and/or time-frequency resources allocated for the user equipment to perform a subsequent uplink transmission. Then as shown in step 130 of FIG. 1 the UE 10 sends towards the gNB 12 scheduled transmission. This may be referred to as Msg3 (Message 3) to the base station according to information in the RAR, the MsgC including information such as a user equipment terminal identifier and an RRC link request. Further, this MsgC may be communicated on UL-SCH containing a C-RNTI MAC CE or CCCH SDU, submitted from upper layer and associated with the UE Contention Resolution Identity, or as part of a Random Access procedure. In this example the user equipment terminal identifier is an identifier that is unique to a user equipment and used for resolving collision. Then as shown in step 140 of FIG. 1 for (a) Contention-Based random access the gNB 12 sends towards the UE 10 contention resolution. This may be referred to as Msg4 (Message 4) collision resolution or identifier to the user equipment. In this example the collision resolution identifier can include an identifier corresponding to a user equipment who wins in the collision resolution. Following this there can be further UL/DL transmissions based on the RA.

It has been agreed to employ a 2-step CBRA procedure. An example of the 2-step CBRA procedure is briefly introduced below with reference to FIG. 1B. In a RA procedure of FIG. 1B, as shown in step A of FIG. 1B a terminal device such a UE 10 transmits a first message (which may be referred to as "MSGA") to a network device. The first message combines a random access preamble (similar as "MSG1") and uplink data (similar as "MSG3"). For example, MSGA includes a random access preamble on physical random access channel (PRACH) and a payload on physical uplink shared channel (PUSCH). After MSGA transmission, the terminal device starts to monitor for a response from the network device within a configured window.

Figure 1B:
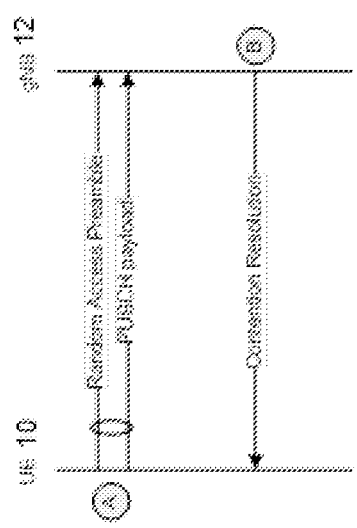
FIG. 1B show a 2-step contention based random access (CBRA) procedure.

Depending on contention across its serving terminal devices, the network device may transmit a second message (which may be referred to as "MSGB") to the terminal device. The second message may combine a random access response (similar as "MSG2") and a contention resolution (similar as "MSG4") as shown in step B of FIG. 1B. If contention resolution is successful upon receiving the MSGB, the terminal device ends the random access procedure as shown in FIG. 1B In general, MSGB may include response(s) for contention resolution, fallback indication(s), and backoff indication. In some cases, contention resolution may not be included in the MSGB, for example in the case of fallback from 2-step CBRA to MSG3 transmission (4-step CBRA).

Figure 1C:
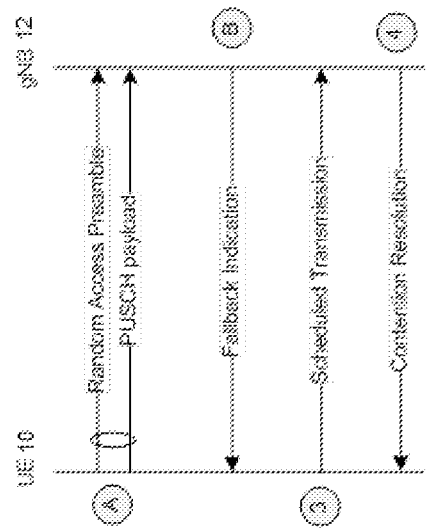
FIG. 1C shows a fallback from 2-step CBRA to 4-step CBRA.

An example procedure of fallback from 2-step CBRA to 4-step CBRA is shown in FIG. 1C. In the example procedure of FIG. 1C, as shown in step A of FIG. 1C a terminal device such as a UE 10 transmits to a network device MSGA. As shown in FIG. 1C the network device can be a gNB such as a gNB 12. This transmission from UE 10 which may include a random access preamble on PRACH and a payload on PUSCH. The network device may detect only the preamble part of the MSGA and transmits to the terminal device MGSB, which in this example includes a fallback indication as shown in step B of FIG. 1C. Then, the terminal device falls back to the 4-step CBRA and transmits MSG3 to the network device by using the UL resource indicated in the fallback indication. As shown in step 3 of FIG. 1C this MSG 3 can be a scheduled transmission. Then as shown is step 4 of FIG. 1C the network device or gNB 12 transmits MSG4 to the terminal device or UE 10. If contention resolution is not successful after MSG3 (re)transmission(s), the terminal device may go back to MSGA transmission. If the 2-step CBRA is not successful after a configured number of MSGA transmissions, the terminal device may switch to the 4-step CBRA procedure.

It is noted that during these operations the UE 10 can upgrade TC-RNTI to Cell-Radio Network Temporary Identifier (C-RNTI) upon detecting its own identifier. In addition, the UE may transmit an Acknowledgement (ACK) signal to the base station to complete the random access process and wait for the scheduling of the base station. In another case, the user equipment may start a new random access process after a certain delay.

In FIG. 1 for (b) contention-free random access (CFRA) there is as shown in step 150 the gNB 12 communicating with the UE 10 an RA preamble assignment. As shown in step 160 of FIG. 1 the UE 10 sends towards the gNB 12 a random access preamble. Then in step 170 of FIG. 1 for (b) contention-free random access the gNB 12 sends towards the UE 10 a random access response.

As above, for (b) contention-free random access (CFRA) as in FIG. 1 there can be at a start of the random access process a network base station such as the gNB 12 of FIG. 1 transmitting configuration information of the random access process to the user equipment, and the user equipment performing the random access process according to the received configuration information.

Contention-free random access has been introduced at least to improve efficiency. For contention-free random access there is assigned a dedicated preamble sequence to a UE. For example, a dedicated preamble/subcarrier/preamble subcarrier sequence can help enable contention resolution by the network to be omitted and/or avoided. This is such as the network knows to which UE there is assigned a preamble/subcarrier/preamble subcarrier sequence. Thus, the network can assume that with this preamble/subcarrier/preamble subcarrier an access attempt is made by that UE.

Further, for random access in a cell configured with SUL, the network can explicitly signal which carrier to use (UL or SUL). Otherwise, the UE selects the SUL carrier if and only if the measured quality of the DL is lower than a RSRP threshold. Once started, all uplink transmissions of the random access procedure remain on the selected carrier.

With regards to carrier aggregation (CA) related operations, when CA is configured, the first three steps of these four steps of CBRA as shown in FIG. 1 can occur on the PCell while contention resolution (step 140 as in FIG. 1) can be cross-scheduled by the PCell.

In addition, the three steps of a CFRA as shown in FIG. 1 if started on the PCell can remain on the PCell. CFRA on SCell may be initiated by the gNB to establish timing advance for a secondary TAG: the procedure is initiated by the gNB with a PDCCH order (step 150 as in FIG. 1) that is sent on a scheduling cell of an activated SCell of the secondary TAG, preamble transmission (step 160 as in FIG. 1) takes place on the indicated SCell, and Random Access Response (step 170 as in FIG. 1) takes place on PCell.

Example embodiments of the invention as proposed herein can be applied for a benefit to operations using either of a contention-based RACH related procedure or a contention-free RACH related procedure.

In accordance with an example embodiment of the invention there is provided that in a mode such as a CONNECTED mode, for a UE configured with WUS, at least the following rules are defined when WUS occasion overlaps with a Random Access Response window (RAR window or MsgB window).

Figure 2:
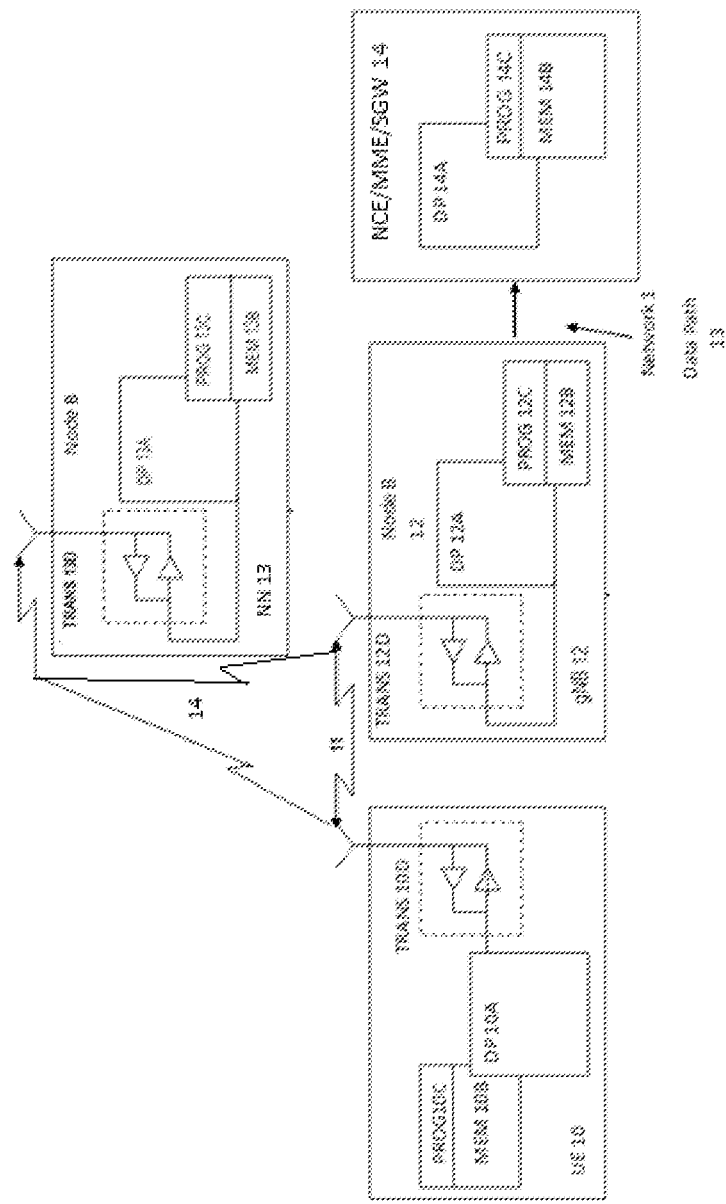
FIG. 2 shows a high level block diagram of various devices used in carrying out various aspects of the invention.

Before describing the example embodiments of the invention in detail, reference is made to FIG. 2 for illustrating a simplified block diagram of various electronic devices that are suitable for use in practicing the example embodiments of this invention.

FIG. 2 shows a block diagram of one possible and non-limiting exemplary system in which the example embodiments of the invention may be practiced. In FIG. 2, a user equipment (UE) 10 is in wireless communication with a wireless network 1. A UE is a wireless, typically mobile device that can access a wireless network. The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 18 to gNB 12 and NN 13, respectively. The one or more memories MEM 10B include computer program code PROG 10C. The UE 10 communicates with gNB 12 and/or NN 13 via a wireless link 111.

The gNB 12 (NR/5G Node B or possibly an evolved NB) is a base station such as a master or secondary node base station (e.g., for NR or LTE long term evolution) that communicates with devices such as NN 13 and UE 10 of FIG. 2. The gNB 12 provides access to wireless devices such as the UE 10 to the wireless network 1. The gNB 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories MEM 12B and the computer program code PROG 12C are configured to cause, with the one or more processors DP 12A, the gNB 12 to perform one or more of the operations as described herein. The gNB 12 may communicate with another gNB or eNB, or a device such as the NN 13. Further, the link 11 and or any other link may be wired or wireless or both and may implement, e.g., an X2 or Xn interface.

Further the link 11 may be through other network devices such as, but not limited to an NCE/MME/SGW device such as the NCE/MME/SGW 14 of FIG. 2.

The NN 13 can comprise a mobility function device such as an AMF or SMF, further the NN 13 may comprise a NR/5G Node B or possibly an evolved NB a base station such as a master or secondary node base station (e.g., for NR or LTE long term evolution) that communicates with devices such as the gNB 12 and/or UE 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the gNB 12 and the UE 10 or any other device using, e.g., link 11 or another link. These links maybe wired or wireless or both and may implement, e.g., an X2 or Xn interface. Further, as stated above the link 11 may be through other network devices such as, but not limited to an NCE/MME/SGW device such as the NCE/MME/SGW 14 of FIG. 2. The NCE/MME/SGW 14 including MME (Mobility Management Entity)/SGW (Serving Gateway) functionality, such as User Plane Functionalities, and/or an Access Management functionality for LTE and similar functionality for 5G.

The one or more buses of the device of FIG. 2 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the gNB 12 being physically in a different location from the RRH, and the one or more buses 157 could be implemented in part as fiber optic cable to connect the other elements of the gNB 12 to a RRH.

It is noted that although FIG. 2 shows a network node or base station such as the gNB 12 as in FIG. 2 and mobility management device such as the NN 13 as in FIG. 2, these devices can incorporate or be incorporated into an eNodeB or eNB or gNB such as for LTE and NR, and would still be configurable to perform example embodiments of the invention as described in this application.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a network control element (NCE/MME/SGW) 14 that may include NCE (Network Control Element), MME (Mobility Management Entity)/SGW (Serving Gateway) functionality, and which provides connectivity with a further network, such as a telephone network and/or a data communications network (e.g., the Internet). The gNB 12 and the NN 13 are coupled via a link 13 and/or link 14 to the NCE/MME/SGW 14. In addition, it is noted that the operations in accordance with example embodiments of the invention, as performed by the NN 13, may also be performed at the NCE/MME/SGW 14.

The NCE/MME/SGW 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM14B and the computer program code PROG 14C are configured to, with the one or more processors DP 14A, cause the NCE/MME/SGW 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10A, DP12A, DP13A, and/or DP14A and memories MEM 10B, MEM 12B, MEM 13B, and/or MEM 14B, and also such virtualized entities create technical effects.

The computer readable memories MEM 10B, MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 10B, MEM 12B, MEM 13B, and MEM 14B may be means for performing storage functions. The processors DP10A, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10A, DP12A, DP13A, and DP14A may be means for performing functions, such as controlling the UE 10, gNB 12, NN 13, NCE/MME/SGW 14 and other functions as described herein.

As similarly stated above example embodiments of the invention provide that in a mode such as a CONNECTED mode, for a UE configured with WUS, at least the following rules are defined when WUS occasion overlaps with Random Access Response window (RAR window or MsgB window).

In accordance with an example embodiment of the invention when there is a Contention Based Random Access (CBRA) procedure or Contention Free Random Access (CFRA) there can be:

In one option, when the Random Access procedure is triggered and/or ongoing, the UE does not monitor WUS during WUS occasion if it overlaps with ra-Response Window or MsgB-Response Window and starts the drx-onDurationTimer in the next DRX OnDuration occasion;

In one option the UE can skip monitoring the WUS only if it did not perform BWP switch to perform the Random Access procedure;

In one option, when the Random Access procedure is triggered, UE ignores WUS if it is received during ra-Response Window or MsgB-Response Window and starts the drx-onDurationTimer in the next DRX OnDuration occasion; and/or In one option the UE stops Random Access procedure if WUS is received during the procedure.

In accordance with another example embodiment of the invention when there is a Contention Free Random Access (CFRA) procedure there can be:

In one option the NW can configure if the UE shall decode WUS on WUS occasion or whether the UE can ignore monitoring the WUS during WUS occasion if it overlaps with ra-Response Window or MsgB-Response Window and starts the drx-onDurationTimer in the next DRX OnDuration occasion:

Alternatively, one of the above behaviors is specified;

In another option, in case of CFRA BFR, the UE can monitor WUS on recoverySearchSpace defined for the BFR. In case UE detects WUS sent to the UE over recoverySearchSpace, it can determine the RA procedure for the BFR to be successful (along with the BFR procedure):

This stems from the fact that the NW can identify the UE from the preamble and hence knows if the WUS occasion overlaps with the RAR window.

In still another example embodiment of the invention, whenever the UE receives successful Random Access Response (scheduled with RA-RNTI/MsgB-RNTI/C-RNTI), it shall start monitoring the WUS regardless of if the ra-Response Window or MsgB-Response Window is still running.

Alternatively, in accordance with example embodiments of the invention the UE may stop the ra-Response Window/MsgB-Response Window after receiving successful Random Access Response and the WUS is configured.

In yet another example embodiment of the invention a WUS can be called e.g. "DCI with CRC scrambled by PS-RNTI".

In another example embodiment of the invention, the UE prioritizes the decoding of Random Access Response (identified by RA-RNTI/MsgB-RNTI/C-RNTI) over decoding of WUS.

Figure 3:
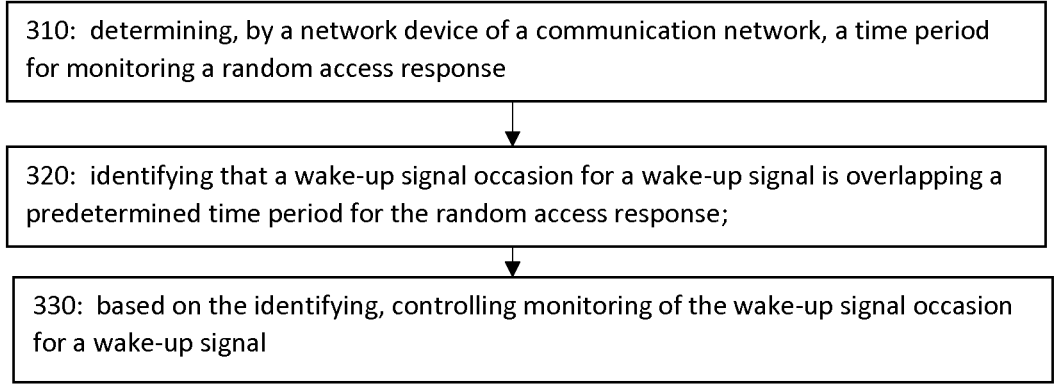
FIG. 3 shows a method in accordance with example embodiments of the invention which may be performed by an apparatus.

FIG. 3 show a method in accordance with example embodiments of the invention which may be performed by an apparatus.

FIG. 3 illustrates operations in accordance with example embodiments of the invention which may be performed by a network device such as, but not limited to, a network device such as a UE 10 as in FIG. 2. As shown in step 310 of FIG. 3 there is determining, by a network device of a communication network, a time period for monitoring a random access response. As shown in step 320 of FIG. 3 there is identifying that a wake-up signal occasion for a wake-up signal is overlapping a predetermined time period for the random access response. Then as shown in step 330 of FIG. 3 there is, based on the identifying, controlling monitoring of the wake-up signal occasion for a wake-up signal.

In accordance with the example embodiments as described in the paragraph above, wherein the controlling comprises: not monitoring or ignoring the wake-up signal occasion; and starting a discontinuous reception timer at a next occasion.

In accordance with the example embodiments as described in the paragraphs above, wherein the wake-up signal is overlapping a random access response window.

In accordance with the example embodiments as described in the paragraphs above, wherein the controlling comprises: causing the network device to not monitor the wake-up signal occasion during the predetermined time period; and starting a discontinuous reception timer in a next wake-up signal occasion.

In accordance with the example embodiments as described in the paragraphs above, wherein the controlling comprises: determining that a bandwidth part switch for the random access response has not been performed; and based on the bandwidth part switch not having been performed, skipping monitoring of the wake-up signal occasion.

In accordance with the example embodiments as described in the paragraphs above, wherein the controlling comprises: determining that the random access response has been triggered; and based on the determining, causing the network device to not monitor the wake-up signal occasion during the predetermined time period, and starting a discontinuous reception timer in a next wake-up signal occasion.

In accordance with the example embodiments as described in the paragraphs above, wherein the controlling comprises: stopping the random access response if a wake-up signal is received during the predetermined time period.

In accordance with the example embodiments as described in the paragraphs above, wherein the controlling comprises at least one of: decoding a wake-up signal during the wake-up signal occasion for performing the random access response, or not monitoring the wake-up signal occasion and starting a discontinuous reception timer in a next wake-up signal occasion.

In accordance with the example embodiments as described in the paragraphs above, wherein the controlling comprises: for a case of a beam failure recovery (BFR), monitoring for a wake-up signal in a search space defined for the BFR; and based on detecting a wake-up signal in the search space determining the random access response for the BFR.

In accordance with the example embodiments as described in the paragraphs above, wherein the controlling is based on the random access response being for a random access procedure comprising one of a contention based random access procedure or a contention free random access procedure.

In accordance with the example embodiments as described in the paragraphs above, wherein the overlapping comprises a wake-up signal overlapping a random access response window for the random access response.

In accordance with the example embodiments as described in the paragraphs above, wherein the determining is based on a received indication of the random access response scheduled with a radio network temporary identifier.

In accordance with the example embodiments as described in the paragraphs above, there is monitoring the wake-up signal occasion regardless of the predetermined time period.

In accordance with the example embodiments as described in the paragraphs above, there is, in response to a successful random access response procedure from the communication network, stopping the predetermined time period for the random access response.

In accordance with the example embodiments as described in the paragraphs above, wherein a wake-up signal for the wake-up signal occasion is using downlink control information using a cyclic redundancy check (CRC) scrambled by a radio network temporary identifier (PS-RNTI).

In accordance with the example embodiments as described in the paragraphs above, wherein the controlling is based on a configuration received from the communication network.

In accordance with the example embodiments as described in the paragraphs above, wherein the predetermined time period comprises a random access response window.

In accordance with the example embodiments as described in the paragraphs above, wherein the network device is in a connected mode with the communication network.

A non-transitory computer-readable medium (MEM 10B as in FIG. 2) storing program code (PROG 10C as in FIG. 2), the program code executed by at least one processor (DP 10A as in FIG. 2) to perform the operations as at least described in the paragraphs above.

In accordance with an example embodiment of the invention as described above there is an apparatus comprising: means for determining (TRANS 10D, MEM 10B, PROG 10C, and DP 10A as in FIG. 2), by a network device (UE 10 as in FIG. 2) of a communication network (Network 1 as in FIG. 2), a time period for monitoring a random access response; means for identifying (TRANS 10D, MEM 10B, PROG 10C, and DP 10A as in FIG. 2) that a wake-up signal occasion for the network device is overlapping a predetermined time period for the random access response; and means, based on the identifying, for controlling monitoring (TRANS 10D, MEM 10B, PROG 10C, and DP 10A as in FIG. 2) of the wake-up signal occasion for a wake-up signal.

In the example aspect of the invention according to the paragraph above, wherein at least the means for receiving, identifying, and controlling comprises a non-transitory computer readable medium [MEM 10B] encoded with a computer program [PROG 10C] executable by at least one processor [DP 10A].

Advantages of operations in accordance with example embodiments of the invention as disclosed herein include at least that:
  UE behavior in case the WUS overlaps with Random Access Response window is clearly defined; and
  NW can configure how the UE should behave in terms of WUS in case it requires UE to perform CFRA.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. An apparatus, comprising:
   at least one processor; and
   at least one non-transitory memory storing instructions executed by the at least one processor to cause the apparatus at least to:
   determine a time period for monitoring a random access response;
   identify that a wake-up signal occasion for a wakeup signal is overlapping a predetermined time period for the random access response, wherein the predetermined time period comprises the determined time period; and
   based on the identifying, control monitoring of the wake-up signal occasion for a wake-up signal;
   based on the controlling, not monitor the wake-up signal occasion during the predetermined time period for the random access response;
   determine that the random access response has been triggered; and
   based on the determining, cause the apparatus to not monitor the wake-up signal occasion during the predetermined time period for the random access response; and
   start a discontinuous reception timer at a next discontinuous reception OnDuration occasion.

2. The apparatus of claim 1, wherein the controlling comprises: ignoring the wake-up signal occasion wherein the discontinuous reception timer is started at a next wake-up signal occasion.

3. The apparatus of claim 1, wherein the at least one non-transitory memory is storing instructions executed by the at least one processor to cause the apparatus to: determine that a bandwidth part switch for the random access response has not been performed; and based on the bandwidth part switch not having been performed, skip monitoring of the wake-up signal occasion.

4. The apparatus of claim 1, wherein the at least one non-transitory memory is storing instructions executed by the at least one processor to cause the apparatus to: stop the random access procedure if a wake-up signal is received during the predetermined time period.

5. The apparatus of claim 1, wherein the at least one non-transitory memory is storing instructions executed by the at least one processor to cause the apparatus to: at least one of:
   decode a wake-up signal during the wake-up signal occasion, or
   not monitor the wake-up signal occasion and start a discontinuous reception timer in a next wake-up signal occasion.

6. The apparatus of claim 1, wherein the at least one non-transitory memory is storing instructions executed by the at least one processor to cause the apparatus to: for a case of a beam failure recovery, monitor for a wake-up signal in a search space defined for the beam failure recovery; and based on detecting a wake-up signal in the search space determine the random access procedure for the beam failure recovery to be successful.

7. The apparatus according to claim 1, wherein the controlling is based on the random access response being for a random access procedure comprising one of a contention based random access procedure or a contention free random access procedure.

8. The apparatus of claim 1, wherein the overlapping comprises a wake-up signal overlapping a random access response window for the random access response.

9. The apparatus of claim 1, wherein the determining is based on a received indication of the random access response scheduled with a radio network temporary identifier.

10. The apparatus of claim 9, wherein the at least one non-transitory memory is storing instructions executed by the at least one processor to cause the apparatus to: monitor the wake-up signal occasion regardless of the predetermined time period.

11. The apparatus of claim 9, wherein the at least one non-transitory memory is storing instructions executed by the at least one processor to cause the apparatus to: in response to a successful random access response, stop the predetermined time period for the random access response.

12. The apparatus of claim 1, wherein a wake-up signal for the wake-up signal occasion is using downlink control information using a cyclic redundancy check scrambled by a radio network temporary identifier.

13. The apparatus of claim 1, wherein the controlling is based on a configuration received from a communication network.

14. The apparatus of claim 1, wherein the predetermined time period comprises a random access response window.

15. The apparatus of claim 1, wherein the apparatus is in a connected mode with the communication network.

16. A method, comprising:
- determining, by a network device of a communication network, a time period for monitoring a random access response;
- identifying that a wake-up signal occasion for a wakeup signal is overlapping a predetermined time period for the random access response, wherein the predetermined time period comprises the determined time period; and
- based on the identifying, controlling monitoring of the wake-up signal occasion for a wake-up signal;
- based on the controlling, not monitoring the wake-up signal occasion during the predetermined time period for the random access response;
- determining that the random access response has been triggered; and
- based on the determining, causing the apparatus to not monitor the wake-up signal occasion during the predetermined time period for the random access response; and
- starting a discontinuous reception timer at a next discontinuous reception OnDuration occasion.

17. The method of claim 16, wherein the controlling comprises:
- ignoring the wake-up signal occasion, wherein the discontinuous reception timer is started at a next wake-up signal occasion.

* * * * *